United States Patent [19]

Kopaska et al.

[11] 4,339,907
[45] Jul. 20, 1982

[54] ENDLESS BELT CHANGING IN A ROTARY CROP BALER

[76] Inventors: Arnold F. Kopaska; Larry A. Kopaska, both of Guthrie Center, Iowa

[21] Appl. No.: 209,822

[22] Filed: Nov. 24, 1980

[51] Int. Cl.³ .......................................... A01D 39/00
[52] U.S. Cl. ........................................ 56/341; 100/88
[58] Field of Search ...................... 56/341, 342, 343; 100/88; 198/877; 226/1 NQ; 474/95–99, 120, 151, 903; 192/110 S

[56] References Cited

U.S. PATENT DOCUMENTS

| | | | |
|---|---|---|---|
| 776,310 | 11/1904 | Finley | 285/31 |
| 881,698 | 3/1908 | Kveffer | 474/151 |
| 2,937,042 | 5/1960 | Wilder | 474/903 |
| 2,994,342 | 8/1961 | Stillwagon | 285/325 |
| 4,182,101 | 1/1980 | Gaeddert et al. | 56/341 |

Primary Examiner—Robert A. Hafer
Attorney, Agent, or Firm—Schmidt, Johnson, Hovey & Williams

[57] ABSTRACT

In a baler having a series of belt rollers that are supported by upright panels in a way to present normally uninterrupted, continuous spans across and between the panels, a set of endless belts may be installed on the machine, notwithstanding the presence of the panels at opposite ends of the rollers, by temporarily interrupting each span and slipping the new belts through the interruption. Clearances for belt replacement are presented by removing spacers from the rollers. The spacers are disposed between the proximate ends of roller sections, each pair of sections having a releasable coupling provided with parts which receive the spacers therebetween. The clearances so presented are preferably quite narrow, sufficient only that the belts may be passed through the clearances in an edgewise direction.

15 Claims, 6 Drawing Figures

ENDLESS BELT CHANGING IN A ROTARY CROP BALER

The instant invention relates to replacing endless belts in farm implements used to produce large, round bales of crop materials. The balers employ a series of belts trained about a plurality of rotatable, horizontal rollers journalled between a pair of horizontally spaced, upright panels. The rollers are arranged such that the belts, defining a baling chamber, move in opposite directions at the front and back of the chamber. Crop materials are thereby rotated by the belts to form round bales.

Using endless belts in balers avoids problems encountered with belts that must be connected at their terminal ends to form continuous loops. The seam or splice in belts which must be joined at their ends is a weak zone that often frays or gives way. However, endless belts create a new problem in replacement in that they cannot be moved through the uninterrupted span cooperatively defined by the rollers and panels.

Replacement of worn or damaged endless belts involves tedious and time-consuming severing of the worn belts and splicing together the ends of each new belt after training it about the rollers. Alternatively, the rollers must be detached from the panels, requiring onerous disassembly of the bearing structure. Such necessary but burdensome tasks seriously disrupt and prolong the baling process.

The present invention provides a spacer placed between the proximate ends of each pair of spaced roller sections. Each roller has a coupling with releasable fasteners which holds its spacer in place during operation of the baler. After removal of the fasteners, each spacer can be removed to present a clearance in each roller. The worn belts and the replacement belts may be expeditiously passed through the clearances.

Figure 1:
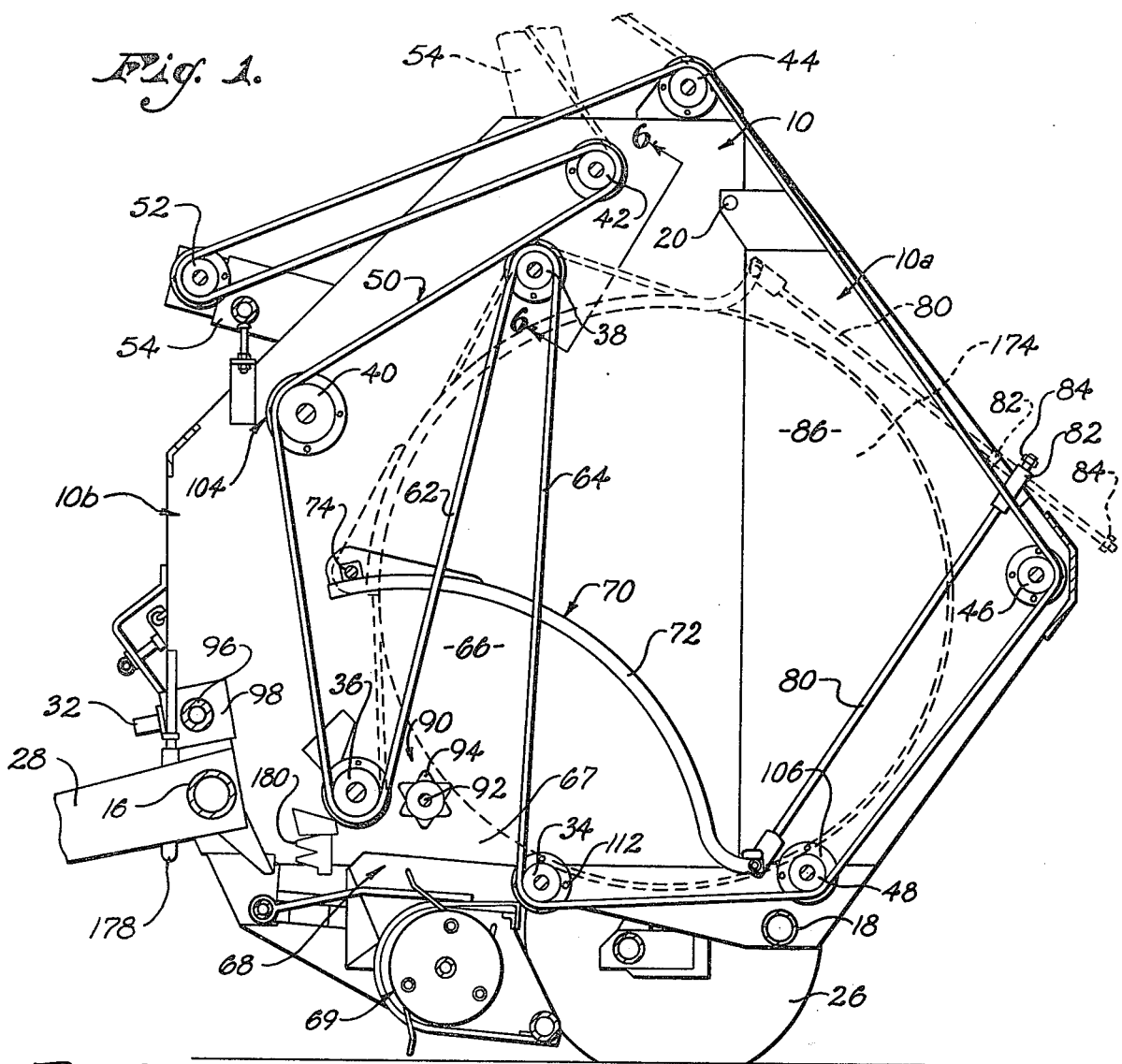
FIG. 1 is a partialy schematic, cross-sectional view of a baler having the improvements of the present invention incorporated therein.
Figure 2:
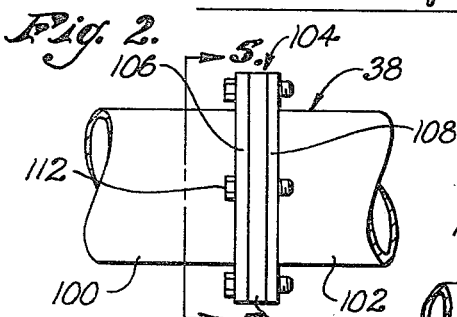
FIG. 2 is an enlarged, fragmentary, elevational view of one of the rollers shown in FIG. 1 provided with the improvements of the present invention.

This invention relates generally to a baler employing a vertically oriented bale-starting chamber as disclosed and claimed in U.S. Pat. No. 4,182,101 entitled "Machine for Coiling Fibrous Crop Materials into Large Round Bales" issued Jan. 8, 1980 in the name of Gaeddert, et al. Although not limited to balers of the type disclosed in the Gaeddert patent, the present invention will be described in connection therewith; accordingly the disclosure of that patent is incorporated herein by reference.

The baler has a pair of laterally spaced side walls 10 and 12 that are separated by various transverse structural members, such as at 16 and 18, the side wall 10 having a rear portion 10a swingably attached to its front portion 10b by a pivot 20. Likewise, the side wall 12 has a rear portion (not shown) swingably attached to a front portion 12b by a pivot so that, in effect, the rear portions cooperate to form a rear gate for the baler that may be raised to a discharge position by hydraulic cylinder assemblies (not shown).

The side walls 10 and 12 are supported by a pair of ground-engaging wheels 26 (only one being shown in the drawings) for travel across a field, and are also provided with a forwardly extending tongue 28 having a coupling at its forwardmost end for hitching the baler to a suitable towing vehicle. The power take-off shaft of the vehicle (not shown) may be connected with a fore-and-aft extending drive shaft 32 above the tongue 28 for supplying power to the various components of the baler in need of such power.

Figure 6:
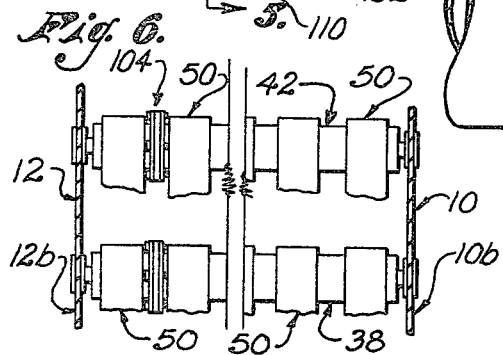
FIG. 6 is a fragmentary view partially in section taken along line 6—6 of FIG. 1.
Figure 5:
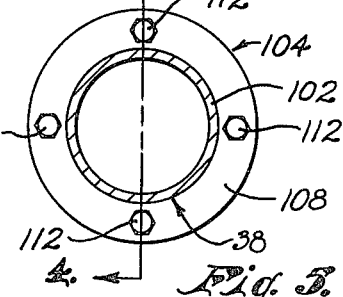
FIG. 5 is a cross-sectional view taken on line 5—5 of FIG. 2.

A plurality of transversely extending rollers span the side walls 10 and 12, including a pair of lower rollers 34 and 36 that are spaced apart in a fore-and-aft direction generally in the forward half of the baler. Other transverse rollers include a roller 38 spaced above and somewhat between the two lower rollers 34, 36, a roller 40 spaced above and somewhat forwardly of the roller 36, a roller 42 spaced above and somewhat rearwardly of the roller 38, a roller 44 spaced above and somewhat rearwardly of the roller 42, a rear roller 46 spaced substantially below and substantially rearwardly of the roller 44, and a lower rear roller 48 spaced forwardly of the roller 46 and at approximately the same level as the roller 34. A single endless, foraminous web in the nature of a series of side-by-side belts 50 (see FIG. 6) is trained about the rollers 34-48 in the manner illustrated in FIG. 1, and also about an additional tensioning roller 52 extending between a pair of arms 54 (only one of which is shown in the drawings) that are swingably attached to the respective side walls 10 and 12 about aligned pivots (not shown). Tension springs (not shown) yieldably bias the arms 54 downwardly to their normal positions illustrated in solid lines in FIG. 1, but allow the same to swing upwardly to the phantom line position in FIG. 1.

This arrangement of the belts 50 provides for the definition of a bale-starting chamber between the side walls 10 and 12 and fore-and-aft stretches 62 and 64 of the belts 50 as illustrated plainly in FIG. 1, such starting chamber being designated by the numeral 66. Inasmuch as the stretches 62 and 64 are essentially upright, the starting chamber 66 is rendered vertically oriented, having an open bottom 67 defined between the rollers 34 and 36, and a top that is defined by an arcuate grid 70 spaced above the rollers 34, 36 and crossing the stretches 62, 64. An unrestricted, open throat 68 is defined on the immediate upstream side of the open bottom 67 generally between a pickup 69 on the one hand and the front roller 36 on the other hand. The grid 70 includes a series of elongated, laterally spaced-apart elements 72 (one only being shown) that are interspersed between adjacent belts 50 of the stretches 62, 64, the grid 70 extending entirely across the chamber 66. The forward end of the grid 70 is secured to a transverse pivot 74 spanning the side walls 10, 12 so as to adapt the grid 70 for vertical swinging movement between the solid position and the phantom line position of FIG. 1, such swinging being yieldably resisted by a spring assembly (not shown) on the outside of the wall 10b that is coupled with a crank (not shown) operably connected to the grid 70. At the rear of the grid 70 a limit rod 80 is pivotally connected at its lower end to the grid 70 and is telescopically received at its upper end by a pivotally mounted tube 82 secured to the rear portion 10a. A nut 84 on the outermost end of the rod 80 limits the extent of downward travel of the rod 80 through the tube 82 and thereby establishes the lower limit of swinging movement of the grid 70.

Swinging of the arms 54 to the phantom position of FIG. 1 releases stored slack in the belts 50 so that the stretches 62, 64 can be deflected laterally to their phantom positions of FIG. 1 corresponding to a position of maximum bale growth and also defining the limits of what may be termed a larger baling chamber 86 that has evolved from the chamber 66. The roll 38 remains in a fixed position during such enlargement, and the grid 70 serves as a limit to the upward travel of materials within the chamber 66, the belts 50 normally being driven in such a direction that the stretch 62 is moving downwardly, while the stretch 64 is moving upwardly.

The pickup 69 is suspended immediately below the chamber 66 and substantially between the roll 34 and the roll 36 for lifting materials off the ground and delivering the same directly upwardly into the chamber 66 through the throat 68 and the open bottom 67.

As illustrated best in FIG. 1, the chamber 66 is provided with bale-positioning means in the nature of a roller component 90 spanning the machine between the side walls 10, 12 and mounted for rotation about a transverse, horizontal axis 92. The roller 92 extends parallel to the roll 36 a short distance behind the latter and at approximately the same level. The periphery of the roller 90 is undulated along the length thereof, such configurations being achieved by the attachment of a plurality of angle members 94 thereto.

As shown in FIG. 1, the shaft 32 makes a right angle connection with a transverse drive shaft 96 within a gear box 98 at the rear of the tongue 28. The shaft 96 distributes driving power to the pick-up 88, the belts 50, and the roll 90.

In operation, the pick-up 69 is ready to lift the crop materials from the field upon advancement of the baler. As such operation is begun, the stretches 62 and 64 move in opposite, generally vertical directions so that material lifted by the pick-up 69 and fed directly up into the chamber 66 is lifted at the rear by the stretch 64 and pulled downwardly at the front by the stretch 62, thereby inducing a rolling action within the chamber 66. The rigid grid 70 contributes to this action, particularly in view of its downward arcuate configuration, and also serves to assist in the even distribution of material entirely across the width of the machine within the chamber 66.

As the baler advances and additional material is fed upwardly into the chamber 66 by the pick-up 69 the rolling bale presses laterally against the stretches 62, 64 and upwardly against the grid, whereby these boundaries for the chamber 66 begin to retreat toward their phantom positions of FIG. 1, and the chamber 66 evolves into the chamber 86 conforming in size and shape to that of the finished bale denoted by the numeral 174. Once the bale 174 has achieved this size, advancement of the machine stops while operation of the belts 50 continues so as to spin the bale 174 within the chamber 86 for wrapping with twine from a box (not shown) and distributed by a suitable twine tube mechanism 178. A cutting device 180 severs the twine once the bale 174 has been wrapped several times helically by the twine.

The bale 174 is removed from the baler by raising the portions 10a, 12a upwardly about the pivot 20; the bale 174 is thereby expelled from the chamber 86.

In accordance with my present invention, each roller is provided with a belt clearance means, but for purposes of illustration, only the roller 38 will be referred to in the following description.

The roller 38 is provided with a pair of collinear sections 100 and 102 having their proximal ends in spaced relationship. A releasable coupling 104 includes continuous, radial flanges 106 and 108 rigidly secured to and tightly (as by welding) surrounding the sections 100 and 102 respectively. An annular, spacer 110 is interposed between the sections 100 and 102 and between the flanges 106 and 108. The spacer 110 is clamped in place between the flanges 106 and 108 by an annular row of releasable, spaced-apart bolts 112 extending through the flanges 106 and 108 and through the spacer 110 exteriorly of the roller 38 to draw the ends of the sections 100 and 102 into tight abutment with the spacer 110.

Figure 4:
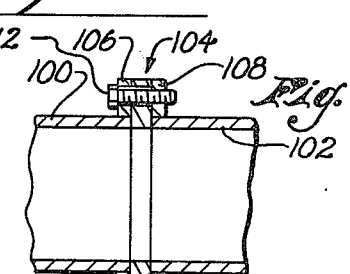
FIG. 4 is a fragmentary cross-sectional view taken along line 4—4 of FIG. 5.

As best seen in FIG. 4, the internal diameter of the spacer 110 is the same as the internal diameter of the tubular roller 38 and the spacer 110 is axially aligned with both sections 100 and 102. The outside diameters of the spacer 110 and the flanges 106 and 108 are equal.

Figure 3:
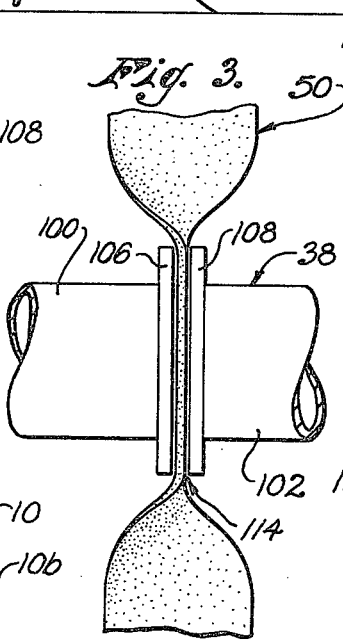
FIG. 3 is a view similar to FIG. 2 after removing the spacer, twisting the belt, and slipping it edgewise into the clearance.

Normally, attachment of the rollers 34–48 at their opposite ends to the side walls 10 and 12 forms continuous, uninterrupted spans across the baler. To replace the endless belts 50, such spans are temporarily interrupted. To this end, the bolts 112 are removed from the flanges 106 and 108 and the spacers 110 of all of the rollers 34–48. The spacers 110 are then removed from between all of the corresponding flanges 106 and 108, presenting clearances 114 in rollers 34–48 (see FIG. 3). The belts 50 are then threaded seriatum through the clearances 114 to remove the belts 50 from the rollers 34–48. On the other hand, the belts being removed may simply be severed and slipped off the rollers without passing through the clearances 114. A set of replacement belts is then threaded through the clearances 114 and shifted into trained engagement with the rollers 34–48.

After installation of the replacement belts 50 is completed, the spacers 110 are placed in the clearances 114, and the bolts 112 are threaded through the flanges 106 and 108 and the spacers 110. Tension in the arms 54 may be relieved during the replacement steps to facilitate the removal of old belts and reinstallation of new, continuous belts.

It can now be appreciated that the entire belt replacement operation can be accomplished quickly and easily without need for special tools or skills and without need for removal of any of the rollers 34–48 from their bearings, sleeves or other mountings used to rotatably support the same. One or more worn belts can be replaced with continuous belts without need for cutting or disconnecting the ends of the used belts, and without need for splicing or use of other interconnections as is required for new, nonendless belts.

The structure which permits the presentation of the clearances 114, wherever located between the side walls 10 and 12 does not interfere with normal operation of the baler and does not, in any way, weaken or otherwise adversely affect the rollers 34–48 or, in any manner, reduce the efficiency of the belts 50 or any other component part of the baler.

We claim:

1. In a farm implement for making round bales from crop material:
   a pair of horizontally spaced uprights;
   means holding said uprights a fixed distance apart;
   a plurality of transverse, horizontal elements rotatably supported by the uprights and arranged in mutually spaced parallelism,
   each of said elements being coupled with said uprights in a manner to present a normally uninterrupted, continuous span across and between the uprights;
   a series of endless, flexible members trained around the elements in engagement therewith; and
   means associated with each element for temporarily interrupting said span and presenting a clearance for the members to permit replacement of the latter.

2. The invention of claim 1, said span interrupting means being intermediate the ends of the elements.

3. The invention of claim 1, said span interrupting means comprising a removable spacer.

4. The invention of claim 3, said members being flat belts, each spacer being a disc having a thickness greater than the thickness of the belts.

5. The invention of claim 3, the spacers being releasably attached to the elements for rotation therewith.

6. The invention of claim 3, each element being provided with a pair of generally collinear sections having their proximal ends in spaced relationship; and a releasable coupling between the sections of each roller respectively, said spacers being removable upon release of the couplings.

7. The invention of claim 6, each coupling having a pair of releasably interconnected components, each component being secured to a corresponding component, the spacers being disposed between said components.

8. The invention of claim 7, each coupling having releasable fastening means interconnecting the components thereof, said fastening means normally holding the spacers against removal from between the components.

9. The invention of claim 8, said components extending radially outwardly from the sections, said fastening means extending through the components and the spacers.

10. The invention of claim 9, the components being continuous flanges surrounding the sections, said fastening means clamping the spacers between the flanges.

11. In a farm implement for making round bales from crop materials,
   a pair of upright walls maintained in fixedly spaced apart relationship;
   a plurality of rotatable, normally horizontal rollers supported between said walls and arranged in spaced parallelism
   a series of flat, endless, flexible belts trained around the rollers in engagement therewith,
   each roller being provided with a pair of collinear sections having their proximal ends in spaced relationship; and
   a releasable coupling for the sections of each roller respectively,
   each coupling including:
      a continuous, radial flange surrounding each section respectively and rigidly secured thereto adjacent said end thereof,
      a spacer between the flanges, and
      an annular row of spaced bolts extending through the flanges and the spacer for clamping the spacer between the flanges,
   said bolts being removable from the flanges and the spacers for release and removal of the latter from between the flanges to permit replacement of the belts through the spaces between the sections of all of the rollers.

12. In a method of installing endless, flexible belts on a farm implement for making round bales from crop materials wherein the belts, when in place, are trained around a plurality of horizontal rollers carried between a pair of fixedly spaced apart uprights in such a manner as to define normally uninterrupted, continuous spans across the uprights, the steps of:
   interrupting each span by opening a space therein;
   slipping the belts through the spaces; and
   discontinuing interruption of the spans by reclosing the spaces.

13. The method of claim 12, wherein said space is opened intermediate the ends of the rollers.

14. The method of claim 13, wherein said space is opened by removing a spacer from each roller respectively.

15. In a method of installing endless, flexible belts on a farm implement for making round bales from crop materials wherein the belts when installed, are trained around a plurality of spaced, horizontal, parallel, rotatable rollers carried by and normally uninterruptedly spanning a pair of mutually and fixedly spaced apart, upright panels, each roller including a removable spacer, the steps of:
   removing said spacers to provide a belt-clearing space for each roller respectively;
   threading each belt through the spaces; and replacing said spacers.

* * * * *